United States Patent [19]
Michon et al.

[11] Patent Number: 5,955,734
[45] Date of Patent: Sep. 21, 1999

[54] HIGH TEMPERATURE TWO-WIRE PHOTOCURRENT DETECTOR CIRCUIT

[75] Inventors: Gerald John Michon, Waterford; Louis Jacob Petrucco, Albany; Dale Marius Brown, Niskayuna, all of N.Y.

[73] Assignee: General Electric Company, Schenectady, N.Y.

[21] Appl. No.: 08/933,897

[22] Filed: Sep. 19, 1997

[51] Int. Cl.[6] .................................................. H03F 3/08
[52] U.S. Cl. ................................. 250/372; 250/214 A
[58] Field of Search ............................ 250/214 A, 372

[56] References Cited

U.S. PATENT DOCUMENTS 5,394,005  2/1995  Brown et al. .
5,589,682  12/1996  Brown et al. ........................ 250/214 A
5,592,124  1/1997  Mullins et al. ...................... 250/214 A

*Primary Examiner*—Constantine Hannaher
*Assistant Examiner*—Darren M. Jiron
*Attorney, Agent, or Firm*—George L. Rideout; Jill M. Breedlove

[57] ABSTRACT

A high temperature photocurrent detector circuit including a transimpedance amplifier having multiple stages of gain, and a driver amplifier which generates a driver current that is proportional to the photocurrent flowing through a photocurrent sensor. The voltage source utilizes source voltage wires to generate a supply current that is proportional to the driver current enabling the photocurrent detector circuit to operate as a two wire photocurrent detector circuit.

16 Claims, 3 Drawing Sheets

HIGH TEMPERATURE TWO-WIRE PHOTOCURRENT DETECTOR CIRCUIT

BACKGROUND OF THE INVENTION

This invention relates to a photocurrent sensor circuit, and more particularly, to a two-wire photocurrent sensor circuit.

Gas turbine flame intensity may be measured and utilized in the gas turbine engine for efficient operation. The flame in a gas turbine engine generates electromagnetic emissions in the visible, infrared, and the ultra-violet electromagnetic spectrum. Ultra-violet emissions of particular interest occur in the range from about 200 to about 400 nano-meters. The silicon-carbide photocurrent sensor has demonstrated it's ability to respond well to ultra-violet emissions in a background of infrared emissions and visible emissions, while being relatively insensitive to the infrared and visible emissions, as is disclosed in U.S. Pat. No. 5,394,005. A five-wire photocurrent detector circuit is disclosed in U.S. Pat. No. 5,589,682, hereinafter identified as Patent '682, which describes a silicon-carbide photocurrent detector. Patent '682 discloses a photocurrent detector circuit coupled to five wires, each wire having one of the following functions: positive power supply coupling; negative power supply coupling; ground coupling; and couplings for each of two output signals. It is advantageous to minimize the number of wires in gas turbine so as to reduce the complexity, cost, and maintenance. It is thus desirable to employ a silicon-carbide photocurrent detector circuit capable of operating effectively with as few connections as possible.

A gas turbine engine typically operates over a wide temperature range. The flame generated by the gas turbine engine typically generates temperatures above 2000 degrees Celsius (C). Hot sections aft of the combustor of a gas turbine may be heated to 300° C. It is desirable to employ a photocurrent detection circuit that will measure photocurrent accurately at temperatures up to 300° C.

Reducing the number of components in a photocurrent detection circuit provides potential cost and reliability benefits, making it desirable to employ a photocurrent detector circuit employing as few components as necessary.

SUMMARY OF THE INVENTION

In accordance with this invention, a high reliability photocurrent sensor circuit is utilized for detecting photocurrent corresponding with ultra-violet emissions in a range of about 200 to about 400 nano-meters. The photocurrent detector circuit is operational over a temperature range from about 25 degrees Celsius to about 300 degrees Celsius. The photocurrent detector circuit provides a flame intensity current signal in correspondence with the flame intensity of a turbine engine. The flame intensity current signal is combined with the supply current in the two photocurrent detector power supply wires so that an external current detector can measure the flame intensity.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in which:

DETAILED DESCRIPTION OF THE INVENTION

Figure 1:
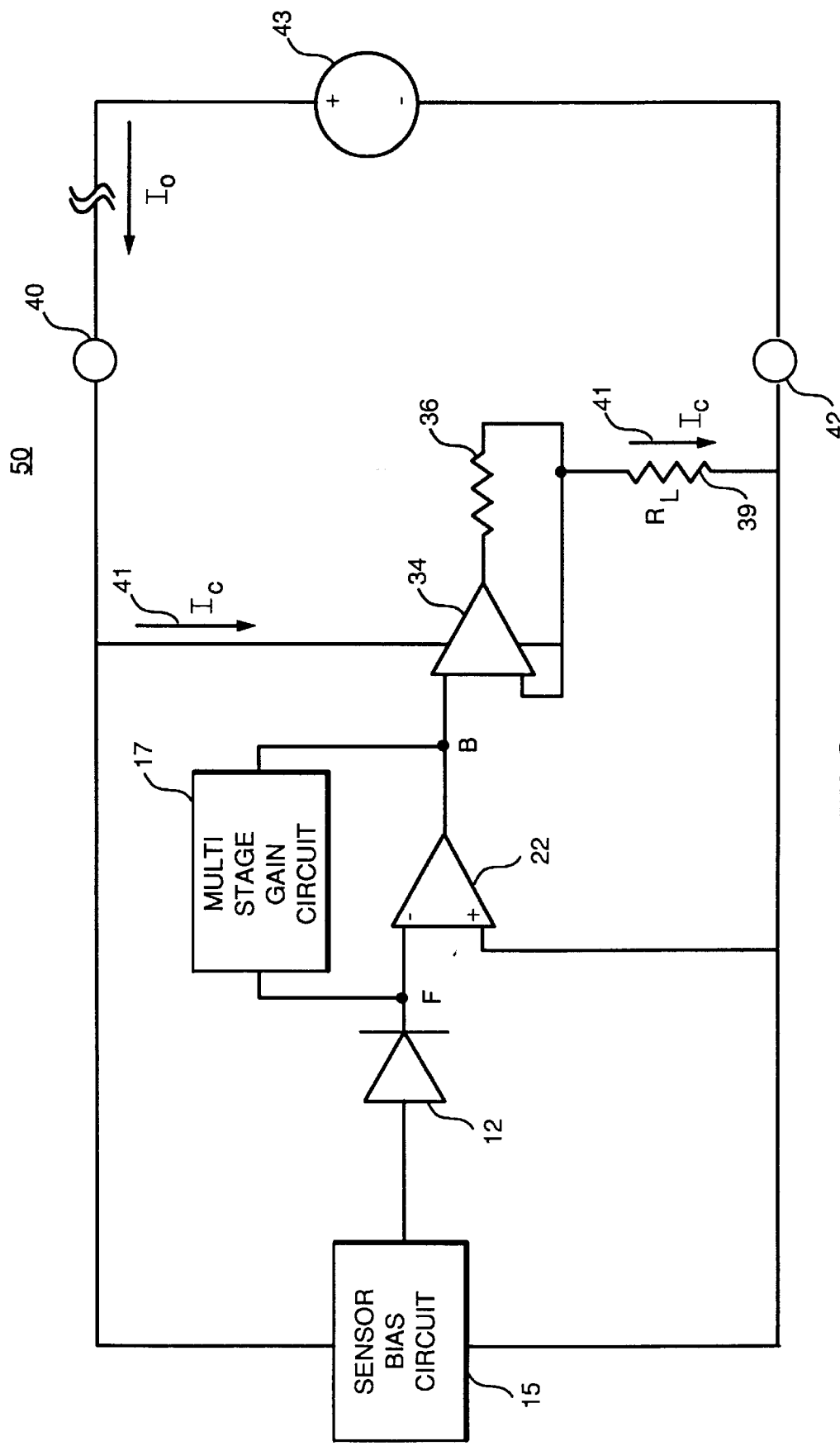
FIG. 1 is a schematic block diagram of the present invention.

A schematic block diagram of a photocurrent detector circuit 50 is illustrated in FIG. 1. Photocurrent detector circuit 50 detects a portion of the ultra-violet emissions being emitted from a flame in a gas turbine engine and generates a photocurrent in correspondence with the detected energy in the ultra-violet wavelength as sensed by a silicon-carbide based photocurrent sensor 12. The photocurrent generated by photocurrent sensor 12 is then amplified and electrically coupled to the output of photocurrent detector circuit 50 in which a supply current ($I_O$) is generated that is proportional to the gas turbine flame intensity.

Patent '682 discloses a circuit having a clamping function and providing inverting and non-inverting outputs. To reduce the number of components and the number of output wires in a photocurrent detector it is desirable to employ a circuit which eliminates the clamping function, and eliminates the inverting and non-inverting functions disclosed in Patent '682. The present invention accomplishes the above stated reduction in components and substitute functionality by employing a transimpedance amplifier 21, comprising an operational amplifier 22, a multi-stage gain circuit 17, and a current driver 34, as is further discussed below.

Photocurrent detection circuit 50 employs transimpedance amplifier 21 to provide precise amplification of the photocurrent signal generated by photocurrent sensor 12 by establishing multi-levels of gain that prevent the UV emission signal of transimpedance amplifier 21 from going beyond its operational limit, thus eliminating the need for the clamping circuit disclosed in Patent '682. The gain of transimpedance amplifier 21 is hereinafter defined as the output voltage per unit input current. Additionally, photocurrent detection circuit 50 employs current driver 34 to generate a variable driver current 41 ($I_C$) which is proportional to the supply current ($I_O$) that flows through a source voltage 43 from a positive source voltage terminal 40 to a negative source voltage terminal 42. Supply current ($I_O$) thus provides an output signal that is distinct from the inverting and non-inverting output functions disclosed in Patent '682.

Figure 2:
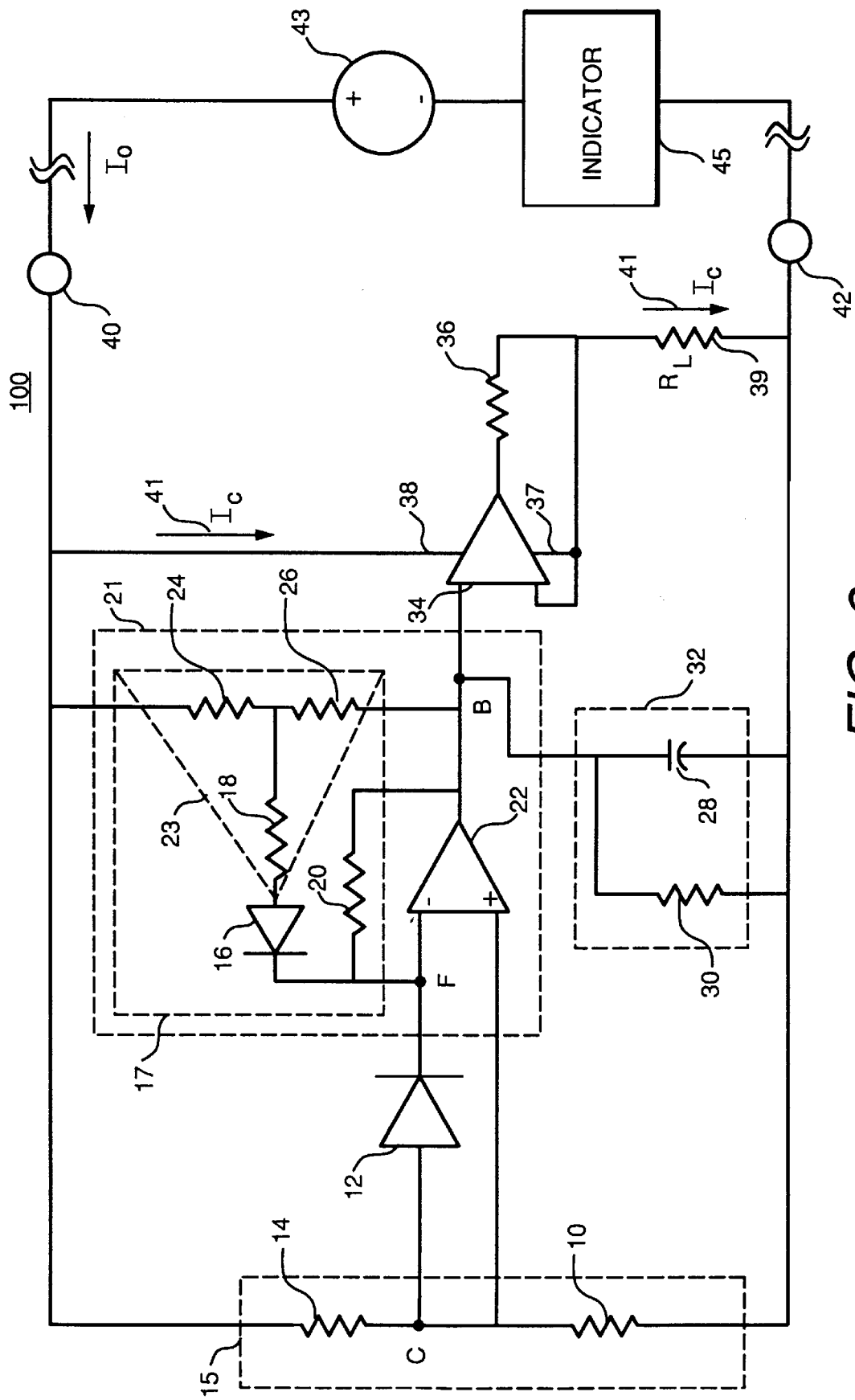
FIG. 2 is a schematic diagram of one embodiment of the present invention.

Photocurrent detector circuit 100 illustrated in FIG. 2 is one embodiment further illustrating photocurrent detector circuit 50 as depicted in the schematic block diagram of FIG. 1. Photocurrent detector circuit 100 comprises the following additional elements: a bias voltage circuit 23; a multi-stage gain circuit 17; a filter circuit 32; a sensor bias circuit 15; a negative driver amplifier terminal 37 and indicator 45, and a positive driver amplifier terminal 38. Sensor bias circuit 15 comprises a first photocurrent sensor bias resistor 10 and a second photocurrent sensor bias resistor. Bias voltage circuit 23 comprises: a low gain resistor 18; a first low gain bias resistor 24; and a second low gain bias resistor 26. Multi-stage gain circuit 17 comprises: a diode 16; a high gain resistor 20; and bias voltage circuit 23. Photocurrent detector circuit 100 is interconnected as illustrated in the schematic diagram in FIG. 2.

The function of elements in photocurrent detector circuit 100 are discussed next including: photocurrent sensor 12; photocurrent sensor bias circuit 15; operational amplifier 22; multistage gain circuit 17; filter circuit 32; and driver amplifier 34.

Photocurrent sensor 12 is disposed in a gas turbine engine such that a portion of the ultra-violet emissions from the gas turbine engine flame is detected by photocurrent sensor 12. As ultra-violet emissions are generated by the flame of the gas turbine engine, a proportional photocurrent is generated in photocurrent sensor 12. Typically, photocurrent sensor 12 generates a photocurrent in the order of magnitude of nano-amps. The magnitude of photocurrent generated by photocurrent sensor 12 directly corresponds with the magnitude of ultra-violet (UV) emissions produced by the jet engine flame—especially UV emissions in the range of about 200 to about 400 nano-meters, with a peak sensitivity of about 270 nano-meters. Properties of the silicon-carbide photocurrent sensor as related to ultra-violet emissions are more fully discussed in commonly assigned Brown et al., U.S. Pat. No. 5,394,005, entitled "Silicon-Carbide Photodiode with Improved Short Wavelength Response and Very Low Leakage Current," issued Feb. 28, 1995, which is herein incorporated by reference.

Detector circuit 100 (FIG. 2) employs sensor bias circuit 15 which generates a bias voltage that is applied at the negative input of operational amplifier 22 so as to cause detector circuit 100 to provide a minimal driver current 41 ($I_C$) generated by current driver 34. This bias voltage is selected to generate a bias current greater than the maximum current drawn by photocurrent detector circuit 100. For example, maximum supply current ($I_B$) is typically about seven milli-amps at 300° C., and is generated based on a bias voltage of about one volt across first photocurrent sensor bias resistor 10.

Transimpedance amplifier 21 converts the photocurrent generated by photocurrent sensor 12 into an UV emission signal. At least two transimpedance gain values may be required because the current generated by photocurrent sensor has a large dynamic range. In this Specification transimpedance amplifier 21 is described as having two values of gain; any number of values of gain, however, may be employed so as to compensate for the sensitivity of a different photocurrent sensor having a unique response characteristic.

Operational amplifier 22 is selected because the input impedance of this amplifier circuit is much lower than the impedance from external elements in photocurrent detection circuit 100 coupled directly to the input at point "F". Additionally, the output impedance of transimpedance amplifier 21 is much lower than the impedance from external elements directly coupled to the output at point "B". The use of transimpedance amplifier 21 enables a UV emission signal to be generated which is proportional to the photocurrent at point "F." Additionally, the use of transimpedance amplifier 21 enables the input current to be substantially unaffected by the impedance from external elements at point "F." Finally, the use of transimpedance amplifier 21 enables the UV emission signal to be substantially unaffected by the impedance of external elements directly coupled to transimpedance amplifier 21 at point "B."

One embodiment of multi-stage gain circuit 17 is a resistance network comprising diode 16; low gain resistor 18; high gain resistor 20; first low gain bias resistor 24; and second low gain bias resistor 26. As the UV emission signal of operational amplifier 22 increases, the feedback voltage increases proportionally with the voltage across high gain resistor 20. Diode 16 is biased by voltage bias circuit 23 so that it is reverse biased. The voltage bias level is set by selecting a first and second low gain bias resistor to provide a predetermined voltage level at point "E." The voltage bias level is set so that transimpedance amplifier 21 is not saturated when the photocurrent is at a maximum level. Diode 16 is forward biased when the photocurrent level is in the upper range thereby reducing the transimpedance at high photocurrent levels. The net effect when diode 16 is forward biased is to reduce the feedback impedance. This reduction in feedback impedance reduces the transimpedance of amplifier 21; as such, the voltage output of transimpedance amplifier 21 is lower when diode 16 is reverse biased. For example, when the resistance of high gain resistor 20 is $2 \times 10^9$ ohms and the resistance of low gain resistor 18 is $2 \times 10^7$ ohms the gain of transimpedance amplifier 21 is respectively $2 \times 10^9$ when diode 16 is reverse biased and $2 \times 10^7$ when diode 16 is forward biased. Again, by way of example and not limitation, the predetermined bias voltage is typically about ⅓ of the full range of the output voltage of transimpedance amplifier 21.

Filter circuit 32 filters the UV emission signal of transimpedance amplifier 21. The point at which filter circuit 32 is active is determined by the combination selected between filter capacitor 28 and filter resistor 30. Filter circuit 32 is an RC filter.

Filter circuit 32 thus filters undesirable high frequency noise at point "B". By way of example and not limitation, 1000 Hertz noise is filtered at the output of transimpedance amplifier 21; any other filter frequency however, may be selected. Filter circuit 32 also severs to stabilize detector circuit 100.

Current driver 34 controls driver current 41. As the output voltage of current driver 34 rises the voltage at point "A" rises by a proportional amount. Thus, as UV emission signal at point "B" changes the voltage at point "A" correspondingly changes by "substantially the same" percentage. The percentage change defining what is "substantially the same" at point "A" and point "B" is determined by the level of common mode rejection of driver amplifier 34. Driver amplifier 34 is selected so that the common mode rejection enables the difference in voltage at point "A" and point "B" to be a negligible factor in the operation of photocurrent detector circuit 100. The voltage at point "A" controls the current flowing through output current load resistor 39, as defined by equation (1), where IC is driver current 41, $V_B$ is the input voltage of current amplifier 34, and $R_L$ is the resistance of load resistor 39.

$$I_C = V_B / R_L \qquad \text{equation (1)}$$

The current $I_C$ flowing through output current load resistor 39 is substantially the same as the supply current $I_O$ flowing from positive supply voltage terminal 40 to negative supply voltage terminal 42. The difference between driver current $I_C$ and supply current $I_O$ flowing from positive supply voltage terminal 40 is the current flowing through other components of photocurrent detector circuit 100. Typically, driver current $I_C$ is above 99 percent of supply current $I_O$. It should be noted that since the voltage at negative amplifier terminal 37 of current driver 34 is the same voltage as at point "A", consequently, current driver 34 floats at the voltage level of point "A".

Figure 3:
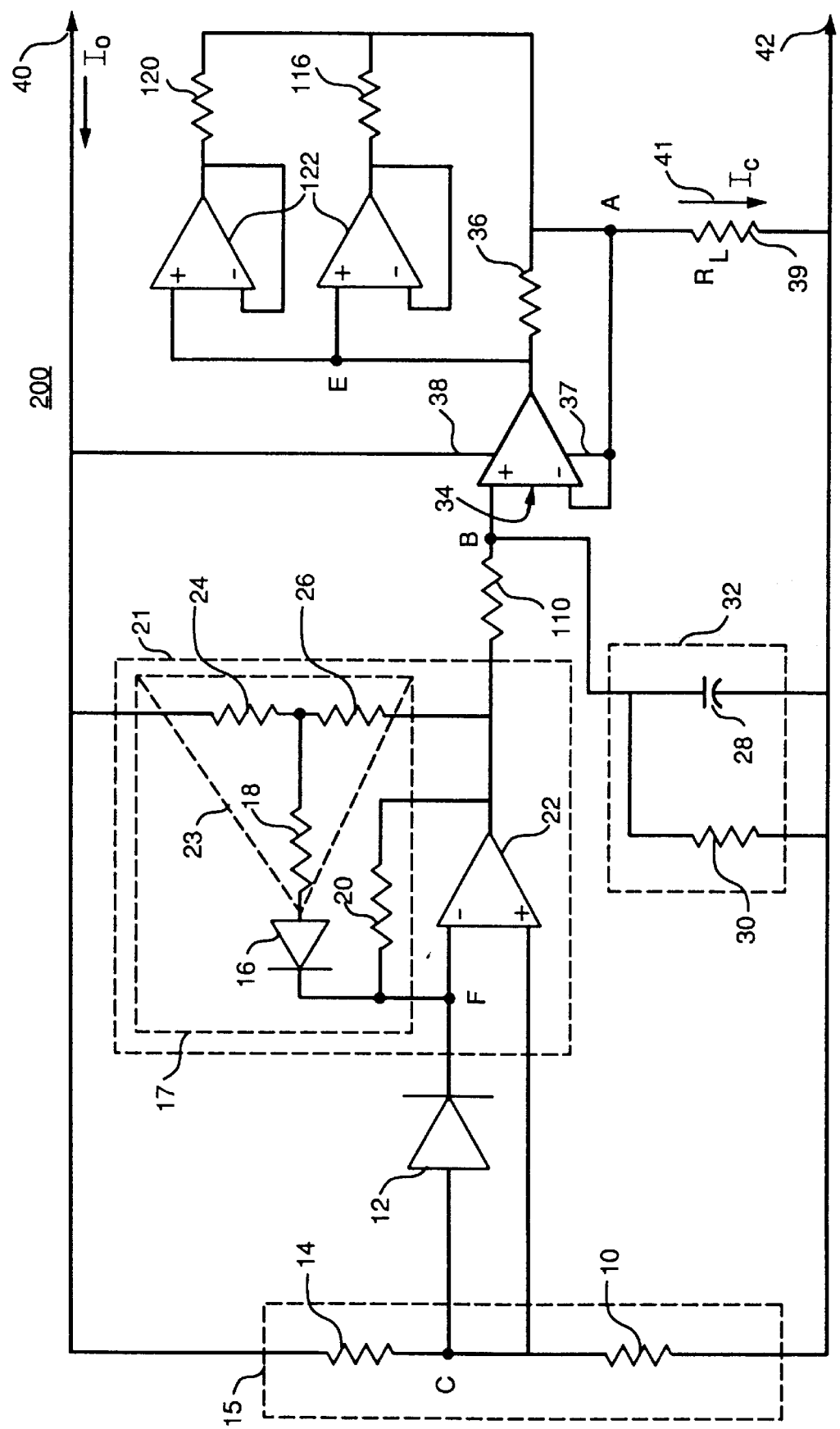
FIG. 3 is a schematic diagram showing further details of one embodiment of the present invention.

A more detailed circuit configuration of photocurrent detector circuit 100 is illustrated in photocurrent detector circuit 200 depicted in FIG. 3. The primary difference between photocurrent detector circuit 100 and more detailed photocurrent detector circuit 200 is the number of current drivers. In photocurrent detector circuit 200, the number of current drivers has been increased to generate more driver current 41 ($I_C$). Detailed photocurrent detector circuit 200 comprises the following additional components: a driver amplifier input resistor 110; a first output current control resistor 116; a second output current control resistor 120; and voltage followers 122. The currents generated by voltage followers 122 are summed at point "A". Driver current 41 ($I_C$) then flows through output current load resistor 39. Consequently, driver current 41 ($I_C$) flowing through output current load resistor 39 and associated source current $I_O$ flowing from positive supply voltage terminal 40 is substantially the same as discussed above. Since the voltage at point "B" is "substantially the same" as the voltage level at point "A" voltage followers 122 track current driver 34, and the respective current generated voltage followers 122 is summed at point "A".

In a typical photocurrent detector circuit 200 configuration, as illustrated in FIG. 3, there is eight milli-amps to twelve milli-amps of difference in supply current $I_O$ from the condition where "Light=1" to the condition where "Light=0" respectively. It is thus straightforward to utilize this information to generate an indication when the condition where "Light=1" is measured. In this Specification "Light" is a number representing the relative measurement of the photocurrent that is sensed by photocurrent sensor 12. The condition where "Light=1" represents the maximum measured value of photocurrent sensor 12 when UV emissions are maximized. The condition where "Light=0" represents the minimum measured value of photocurrent sensor 12 when UV emission are minimal. For example, the "Light=0" condition corresponds with a turbine flame-out. Correspondingly, measurements of current $I_O$ for values of "Light" between and including 1 and 0 represent the intensity of the gas turbine flame. Consequently, this invention enables the turbine flame intensity to be measured and utilized in calculating and controlling gas turbine efficiency.

Table 1 illustrates several columns of supply current ($I_O$) measurements of photocurrent detector circuit 200 at temperatures from 25° C. to 300° C. The first column is a list of values representing "Light" intensities from 1 to 0. The second column is a list of measurements of supply current $I_O$ minus baseline current $I_B$ at about 25° C. The third column is a list of measurements of supply current $I_O$ minus baseline current $I_B$ at about 300° C. As photocurrent sensor 12 senses UV emissions in a range from the "Light=1" condition to the "Light=0" condition at about 25° C., supply current $I_O$ minus baseline current $I_B$ is approximately twelve milli-amps and drops to about zero milli-amps respectively. A similar observation of the present invention is also true at the 300 C level. As photocurrent sensor 12 senses UV emissions in a range from the "Light=1" condition to the "Light=0" condition at about 300° C., supply current $I_O$ minus baseline current $I_B$ is approximately eight milli-amps and drops to about 0.02 milli-amps respectively.

TABLE 1

Supply Current Versus Ultra-violet Level over Temperature
($I_B$ = 8.27 milli-amps and $I_o$ is supply current)
All currents are illustrated in milli-amps

| "Light" | $I_o$–$I_B$ (25 C.) | $I_o$–$I_B$ (300 C.) |
| --- | --- | --- |
| 1.00 | 12.36 | 8.02 |
| 0.93 | 12.20 | 7.84 |
| 0.71 | 11.36 | 7.44 |
| 0.50 | 8.95 | 6.93 |
| 0.32 | 6.39 | 6.04 |
| 0.16 | 3.48 | 3.61 |
| 0.10 | 2.36 | 2.48 |
| 0.00 | 0.00 | 0.02 |

TABLE 1-continued

Supply Current Versus Ultra-violet Level over Temperature
($I_B$ = 8.27 milli-amps and $I_o$ is supply current)
All currents are illustrated in milli-amps The flame generated during normal operation of a gas turbine engine produces ultra-violet emissions that are sensed by photocurrent sensor 12. Photocurrent detector circuit 100 generates supply current $I_O$ flowing from positive supply voltage terminal 40 to negative supply voltage terminal 42 that is proportional to the ultraviolet emissions produced by the gas turbine engine flame. Voltage source 43 provides supply voltage through positive supply voltage terminal 40 and negative supply voltage terminal to photocurrent detector circuit 100. Thus, only two wires are utilized in providing source voltage to photocurrent detector circuit 100 and an output signal as represented by supply current $I_O$.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes which fall within the true spirit of the invention.

What is claimed is:

1. A photocurrent detector circuit coupled to a voltage source and an indicator for converting a photocurrent within a photocurrent sensor into a driver current comprising:

a transimpedance amplifier coupled to said photocurrent sensor wherein said transimpedance amplifier generates a UV emission signal in correspondence with said photocurrent flowing through said photocurrent sensor;

a driver amplifier coupled to said transimpedance amplifier wherein said driver amplifier generates said driver current in correspondence with said UV emission; and a sensor bias circuit coupled to said transimpedance amplifier wherein a bias voltage is generated at a level that provides a minimum level of said driver current of 8 milliamperes;

said driver current generated by said driver amplifier flows through said voltage source signal for driving said indicator.

2. A photocurrent detector circuit, as recited in claim 1 wherein a bias voltage circuit is coupled to said transimpedance amplifier so as to generate a bias voltage to bias a diode.

3. A photocurrent detector circuit as recited in claim 2, wherein a filter circuit is coupled to said transimpedance amplifier output so as to reduce noise generated by said transimpedance amplifier.

4. A photocurrent detector circuit, as recited in claim 3, wherein said transimpedance amplifier further comprises:

a high gain stage; and a low gain stage that is activated by said diode to reduce the gain of said transimpedance amplifier so as to provide proportional current amplification of said photocurrent.

5. A photocurrent detector circuit, as recited in claim 4 wherein said photocurrent detector circuit is operational in a temperature range from about 25 degrees Celsius to about 300 degrees Celsius.

6. A photocurrent detector circuit, as recited in claim 5 wherein said photocurrent detector circuit is coupled to said voltage source at a positive source voltage terminal and at a negative source voltage terminal.

7. A photocurrent detector circuit coupled to a voltage source and an indicator for converting a photocurrent within a photocurrent sensor into a supply current comprising:

a transimpedance amplifier coupled to said photocurrent sensor, said transimpedance amplifier having at least two stages of gain and generating a UV emission signal in correspondence with said photocurrent flowing through said photocurrent sensor;

at least one driver current amplifier coupled to said transimpedance amplifier for providing a driver current corresponding with said UV emission signal; and said driver current generated by said at least one driver current amplifier flows through said voltage source for driving said indicator.

8. A photocurrent detector circuit, as recited in claim 7 wherein said supply current is proportional to said driver current.

9. A photocurrent detector circuit as recited in claim 8, wherein a sensor bias circuit is coupled to said transimpedance amplifier wherein said bias voltage is generated at a level that provides a predetermined minimum level of said driver current.

10. A photocurrent detector circuit as recited in claim 9 wherein said predetermined minimum source current is about 8 milliamperes.

11. A photocurrent detector circuit as recited in claim 10, wherein said sensor bias circuit further comprises a voltage divider network.

12. A photocurrent detector circuit, as recited in claim 11 wherein a bias voltage circuit is coupled to said transimpedance amplifier so as to generate a bias voltage to bias a diode.

13. A photocurrent detector circuit as recited in claim 12, wherein said bias voltage circuit further comprises a voltage divider network.

14. A photocurrent detector circuit, as recited in claim 13, wherein said transimpedance amplifier further comprises:

a high gain stage; and a low gain stage that is activated by said diode to lower the gain of said transimpedance amplifier so as to provide proportional amplification of said photocurrent.

15. A photocurrent detector circuit, as recited in claim 14 wherein said photocurrent detector circuit is operational in a temperature range from about 25 degrees Celsius to about 300 degrees Celsius.

16. A photocurrent detector circuit, as recited in claim 15 wherein said photocurrent detector circuit is coupled to said voltage source at a positive source voltage terminal and at a negative source voltage terminal.

* * * * *